United States Patent [19]
Lambrechts

[11] Patent Number: 6,160,538
[45] Date of Patent: Dec. 12, 2000

[54] MOUSE COMMAND CODING

[75] Inventor: Marc E. C. Lambrechts, Kessel-Lo, Belgium

[73] Assignee: U.S. Philips Corporation, New York, N.Y.

[21] Appl. No.: 09/127,334

[22] Filed: Jul. 31, 1998

[30] Foreign Application Priority Data

Aug. 1, 1997 [EP] European Pat. Off. .............. 97202402

[51] Int. Cl.7 ....................................................... G09G 5/08
[52] U.S. Cl. .......................... 345/163; 345/157; 345/161; 345/167
[58] Field of Search .................................... 345/156–167, 345/173, 179; 463/37, 38

[56] References Cited

U.S. PATENT DOCUMENTS 5,287,120   2/1994   Okada et al. ............................ 345/163
5,570,111   10/1996  Barrett et al. .......................... 345/157

FOREIGN PATENT DOCUMENTS 3523284   1/1987   Germany .......................... G06F 3/33

Primary Examiner—Amare Mengistu
Assistant Examiner—Jimmy Hai Nguyen
Attorney, Agent, or Firm—Edward W. Goodman

[57] ABSTRACT

A method of encoding manipulations of a multidimensional input device, such as a mouse, into data to be communicated to a data processing apparatus. Sensors in the input device detect manipulations of a member of the input device with respect to an X-axis and a Y-axis. From the sensor data, a direction and a magnitude of the manipulation is derived. These intermediate quantities are communicated to the data processing apparatus instead of the X- and a Y-values themselves. In the data processing apparatus, a decoder decodes the intermediate quantities into a further pair of X-and Y-values. The intermediate values more adequately represent the manipulations. Therefore, in input devices having a limited power budget, like TV remote controls and other wireless input devices, the method achieves a higher performance.

12 Claims, 3 Drawing Sheets

MOUSE COMMAND CODING

BACKGROUND OF THE INVENTION

1. Field of the Invention

The invention relates to a method of transforming user manipulations of a multidimensional input device into code vectors for a data processing apparatus, the manipulations being confined to a range around an origin, the method comprising the steps of: (1) dividing the range into a plurality of subranges; (2) assigning a unique code vector to each subrange; and (3) for a particular manipulation, determining a corresponding particular subrange and selecting a corresponding particular code vector for transmission to the data processing apparatus. The invention further relates to a system and a multidimensional input device for carrying out such a method.

2. Description of the Related Art

A method as specified in the preamble is known from German Offenlegungsschrift DE-A 35.23.284. In that document, an input device is described that is used for updating one or more parameters in a data processing apparatus (e.g., co-ordinates of a pointer on a screen). According to that document, a manipulation of the input device is not directly translated to a corresponding parameter value, but to a rate of change of that value. The actual updating is performed in the data processing apparatus. The latter is provided with input data indicative of the manipulation. Hereto, the input device transforms the manipulation into particular input data (further referred to as a code vector), representing the manipulation. Subsequently, the code vector is sent via some kind of communication channel (cable, wireless) to the data processing apparatus. There, a decoder is present to decode the received code vectors into data that can be handled by the data processing apparatus.

In a two-dimensional variant of the known input device, the user manipulation is essentially projected on two orthogonal axes (an X-axis and a Y-axis). From the projections, a code vector is constructed and transmitted that comprises digital representations of the projections.

A special field of application of such input devices is in the area of remote controls, such as, TV remote controls. Remote controls have their own, limited, power supply (battery). A significant amount of power is required for transmitting the code vectors to the data processing apparatus. Therefore, in order to extend battery-life, power can be saved by minimizing the amount of information to be sent to the data processing apparatus. At the same time, the user has to be offered convenient control over the parameter to be adjusted. The latter is determined by aspects such as speed of parameter update, accuracy of parameter update and, in case of a multidimensional input device, convenient simultaneous control over more than one parameter (for example, moving the pointer over the TV screen).

A problem of the known method is that power considerations have not been given attention. Consequently, the known method does not transform the manipulations into efficient code vectors, from a power point of view.

SUMMARY OF THE INVENTION

It is, inter alia, an object of the invention to provide a method as specified in the preamble, having a better balance between power consumption and operational convenience of the input device. To this end, the invention provides a method as specified in the preamble that is characterized in that step (1) comprises the steps of: (1a) dividing the range into a plurality of contiguous concentric rings around the origin; and (1b) dividing each ring into a same number of sectors thereby constituting the subranges. This expresses the basic idea that it is not necessary to reserve a relatively large number of code vectors for manipulations of large magnitude. For example, when updating one out of two parameters, a user will initially provoke a manipulation of large magnitude in a direction corresponding to the relevant parameter for fast but relatively inaccurate adjustment. Subsequently, by provoking manipulations of smaller magnitude, the user will make the final, accurate adjustments. While performing the first step, the user is not interested in accurate control over the second parameter. A similar argument applies to the situation where the user wants to update two parameters simultaneously. In summary, a code vector representing a large magnitude manipulation should not be accompanied by neighboring code vectors that represent basically the same manipulation with only a minor deviation in a perpendicular direction.

In the known input device, the projections on the orthogonal axes are independently coded into the code vectors. This results in a set of code vectors with the above-mentioned feature, namely, that, compared to small magnitude manipulations, large magnitude manipulations are covered by a relatively large amount of code vectors.

Especially when using a non-linear decoding, in which a manipulation corresponds to a rate of change in a non-linear way, the measure of the invention results in a more balanced distribution of subranges than the distribution of the known method. In the known method, manipulations just off either one of the axes are assigned unique code vectors. A kind of clustering of code vectors around the co-ordinate axes takes place. These clustered code vectors render the known method inefficient, as a user will hardly experience a difference between them.

A consequence of the measure of the invention is that the total number of code vectors can be reduced while maintaining the same level of operational convenience. A reduced number of code vectors means that the code vectors can be smaller in terms of the number of bits. Thus, less power will be used by the input device for communicating with the data processing apparatus. It has to be noted that it is also considered to be in line with the invention to interpret the phrase 'a same number of sectors' in step (1b) as 'approximately a same number of sectors.'

The measure in which step (1a) is characterized by dividing the range into a plurality of contiguous concentric rectangular rings around the origin, has the advantage that it leads to a method that can be implemented with very simple components. Suppose, for example, that we have a two-dimensional input device comprising two sensor circuits that produce sensor signals proportional to a magnitude of the manipulation in respective orthogonal directions. With this measure for determining to which particular ring the manipulation corresponds, it suffices to determine the maximum value of either sensor signal. This is an operation that can be realized in hardware very efficiently.

The measure in which step (1b) is characterized by dividing the range into a plurality of contiguous concentric circular rings around the origin, has the advantage that it leads to a very regular transformation, therefore, being experienced as natural by the user. For determining to which ring a manipulation corresponds, the magnitude of the manipulation could be derived by squaring and adding the sensor signals. The particular sector could be determined by deriving some ratio of the sensor signals.

BRIEF DESCRIPTION OF THE DRAWINGS

The invention is further explained below by way of example, with reference to the accompanying drawings in which.

DESCRIPTION OF THE PREFERRED EMBODIMENTS

Figure 1:
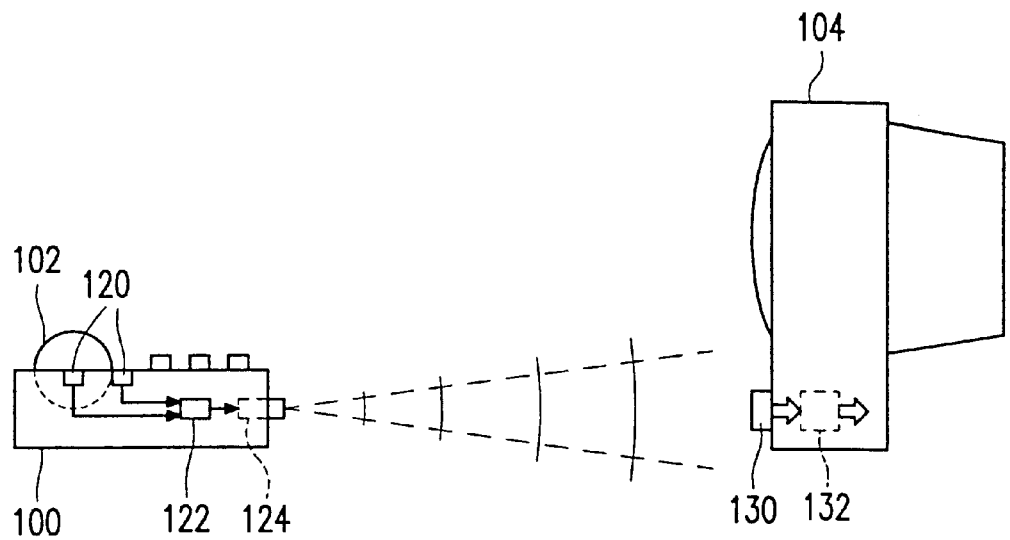
FIG. 1 shows a system in accordance with the invention.

FIG. 1 shows a system in accordance with the invention. It comprises a remote control 100 with a two-dimensional trackball 102, and a data processing apparatus 104 being a TV set. With the remote control 100, a user can select TV channels, set a volume level, select menu items by moving a pointer over the TV screen with the aid of the trackball 102, etc. The remote control 100 further comprises sensor circuits 120 for detecting manipulations of the trackball 102, selection means 122 for selecting code vectors representing said manipulations and transmission means 124 for transmitting said code vectors to the data processing apparatus via an infra-red (IR) communication channel. Alternatively, the remote control 100 comprises a joystick or touch pad instead of the trackball 102.

Each one of the sensor circuits 120 is provided for detecting manipulations in a single dimension. The signals that are produced by the sensor circuits 120 are limited between certain boundaries being imposed by either mechanical or electrical limits, like the finite size of registers for storing the signals, or the clipping of certain analog sensor signals. These boundaries can be regarded as boundaries of a range of possible manipulations of the input device.

In the data processing apparatus 104, a receiver 130 is provided for receiving the code vectors and passing them on to a decoder 132. The decoder 132 decodes the code vectors to corresponding delta vectors that can be used by the data processing apparatus for updating co-ordinates of the pointer on the TV screen.

Figure 2:
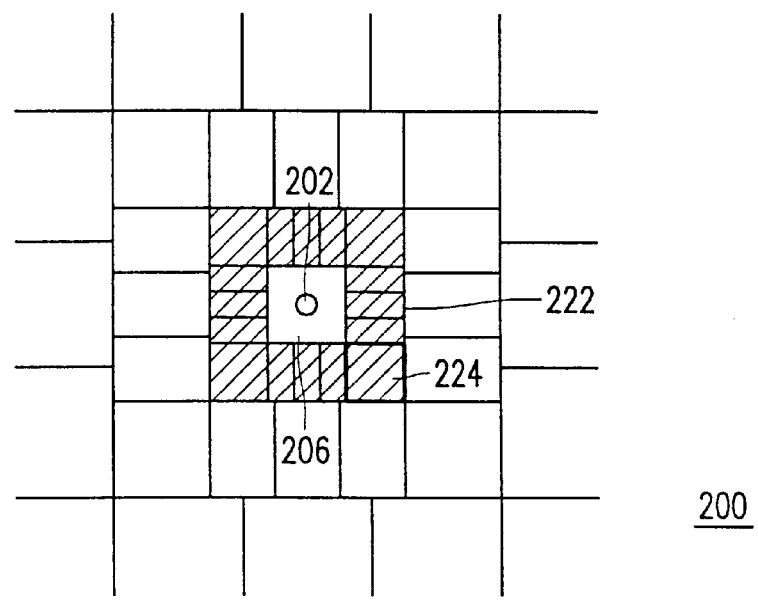
FIG. 2 shows a diagram of a division of the range of manipulations into subranges according to the invention.

FIG. 2 shows a diagram of a division of a range of manipulations into subranges according to the invention. A manipulation of the trackball 102 is restricted to a range 200 around an origin 202. The range 200 is divided according to the invention into rings, one of which being ring 222 that is indicated in the figure by the shaded area. Each ring is divided into a same number of sectors, namely, sixteen. For example, one of the sectors of the ring 222 is sector 224. To each one of the subranges, a unique code vector is allocated. A code vector could explicitly represent the ring number and sector number of the corresponding subrange, or just relate to an arbitrary numbering of the subranges.

For a particular manipulation, the corresponding subrange can be identified by identifying a corresponding ring number and sector number. The ring number is a measure of magnitude of the manipulation and the sector number is indicative of direction. Rotations of the trackball 102 with respect to two perpendicular axes in the plane of the top side of the remote control 100 are detected by the sensor circuits 120, providing two sensor signals. If the sensor signals are proportional to the magnitude of the manipulation, then, for square rings, the ring number is simply determined by the absolute maximum of the sensor signals. By quantizing this maximum value to a limited number of levels, a first group of bits of the code vector is derived. Here we choose that there are sixteen rings, therefore, a four-bit code suffices to code the magnitude of the manipulation.

As shown in FIG. 2, sixteen lines extending radially from the origin can be drawn through the subranges, together traversing all subranges. After numbering, these lines, to each subrange, corresponds a single line number. This line number could be used as a sector number, which could be held in a second group of bits of the particular code vector. In each ring, sixteen different sectors can be identified, therefore 4 bits suffice to code the direction of the manipulation.

Thus we have obtained a code vector comprising eight bits in total for the direction and the magnitude information. The sensor signals of any input device with a rectangular manipulation range can always be scaled to a square range. Therefore, the scheme described here for determining the ring generally applies to rectangular rings.

Finally, the code vector is encoded into a signal that can be efficiently communicated over the IR communication channel, or the code vector is directly used to modulate an IR transmitter signal.

Figure 3:
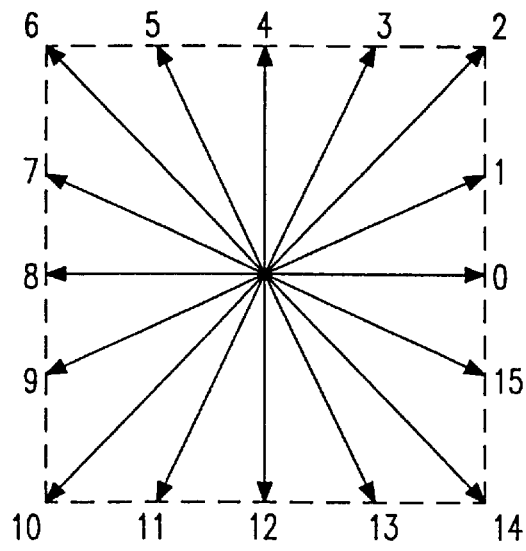
FIG. 3 shows a set of delta vectors corresponding to one of the rings of FIG. 2.

FIG. 3 shows a set of delta vectors corresponding to one of the rings of FIG. 2. In the data processing apparatus, a new pair of screen co-ordinates in X-Y format is constructed, on the basis of the received code vector that is decoded by the decoder 132 into a delta vector. This delta vector stands for a translation of the pointer on the TV screen with respect to a previous position. Sixteen delta vectors, corresponding to a single ring of FIG. 2, are depicted in FIG. 3.

A code vector is translated into a delta vector by translating the ring number and sector number that are contained therein. First a MAX value is obtained from the ring number. The MAX value represents a magnitude of the delta vector. We are free to decode the ring number into a corresponding MAX value in a non-linear way. The non-linear mapping increases the dynamic range of the input device, in the sense that it allows both fast and accurate parameter updates. The non-linear mapping further enhances operational convenience of the input device. Table 1 gives an example of a non-linear mapping. It could be envisaged that the user is allowed to select a particular table that he finds most convenient.

TABLE 1

Speed decoding table

| RING NUMBER | MAX VALUE | RING NUMBER | MAX VALUE |
|---|---|---|---|
| 0 | 1 | 8 | 12 |
| 1 | 2 | 9 | 16 |
| 2 | 3 | 10 | 22 |
| 3 | 4 | 11 | 30 |
| 4 | 5 | 12 | 40 |
| 5 | 6 | 13 | 54 |
| 6 | 8 | 14 | 72 |
| 7 | 10 | 15 | 127 |

Note that in Table 1, there is no ring number reserved for zero MAX value. This implies that when there is no user action, no data is sent to the data processing apparatus 104.

No user action could mean for example, that the input device is in its rest state or, more generally, that there has been no change of state of the input device since the last code vector has been provided to the data processing apparatus 104. Naturally, this is a further way to save power. A further advantage is that, since there is no need for a code vector corresponding to the situation that there is no user action, an extra code vector can be reserved for a more useful event.

Subsequently, the sector number of the code vector is used in order to get the X- and Y-values. Table 2 shows how this is done for the delta vectors of FIG. 3.

TABLE 2

Direction decoding table

| SECTOR NUMBER | X-VALUE | Y-VALUE | SECTOR NUMBER | X-VALUE | Y-VALUE |
|---|---|---|---|---|---|
| 0 | MAX | 0 | 8 | −MAX | 0 |
| 1 | MAX | MAX/2 | 9 | −MAX | −MAX/2 |
| 2 | MAX | MAX | 10 | −MAX | −MAX |
| 3 | MAX/2 | MAX | 11 | −MAX/2 | −MAX |
| 4 | 0 | MAX | 12 | 0 | −MAX |
| 5 | −MAX/2 | MAX | 13 | MAX/2 | −MAX |
| 6 | −MAX | MAX | 14 | MAX | −MAX |
| 7 | −MAX | MAX/2 | 15 | MAX | −MAX/2 |

Figure 4:
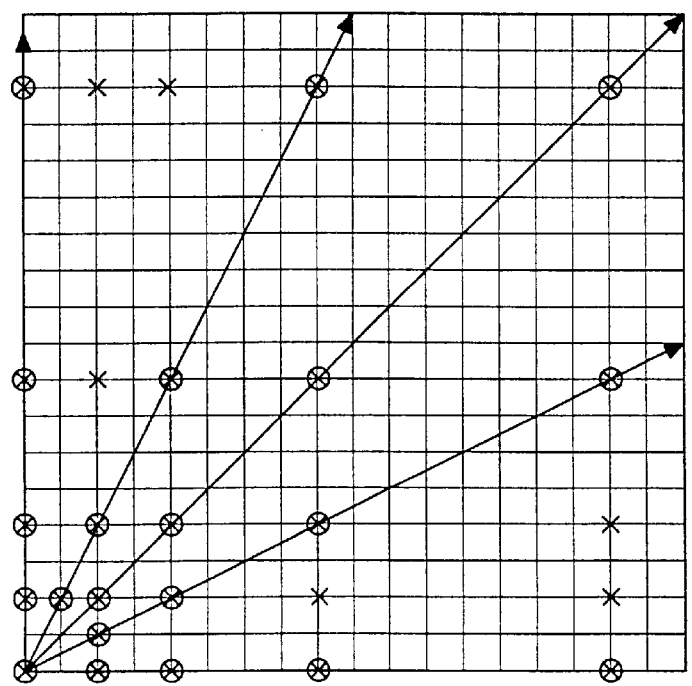
FIG. 4 shows a comparison of a set of code vectors according to the invention with a set of code vectors according to the prior art.

FIG. 4 shows a comparison of a set of code vectors according to the invention with a set of code vectors according to the prior art. Reference is made to FIG. 2. For the sake of clearness, only the upper right quadrant of the range 200 is depicted, whereas only a few code vector magnitudes are included. The code vectors of the prior art method and the method of the invention are indicated by crosses and circles, respectively. FIG. 4 clearly shows the clustering of code vectors that is typical for the prior art method. From this figure it is also clear that with the measure of the invention a more balanced covering with code vectors of the range is obtained.

Figure 5:
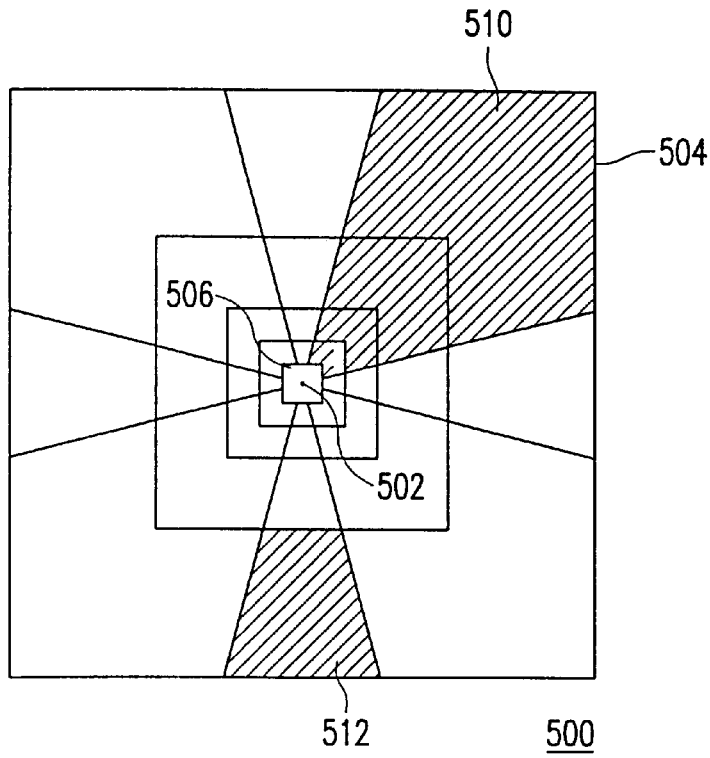
FIG. 5 shows an alternative range of manipulations and division thereof.

FIG. 5 shows an alternative range of manipulations and division thereof. A manipulation of the trackball 102 is restricted to a range 500 around an origin 502. The range has a square border 504, the size of which being determined by the size of respective registers holding projections of the manipulation in respective orthogonal directions. According to an aspect of the invention, the range 500 is divided into more or less triangular wedges and square rings around a center region 506. Intersections of the wedges and rings constitute the subranges. For example, to manipulations of the trackball 102 to the upper right, one of the subranges of wedge 510 is allocated, whereas to a strong downward manipulation, subrange 512 is allocated. A code vector could explicitly code a ring number and a wedge number. The ring number for a particular manipulation can be derived as described with reference to FIG. 2. The wedge number could be determined by deriving some ratio of the sensor signals.

Figure 6:
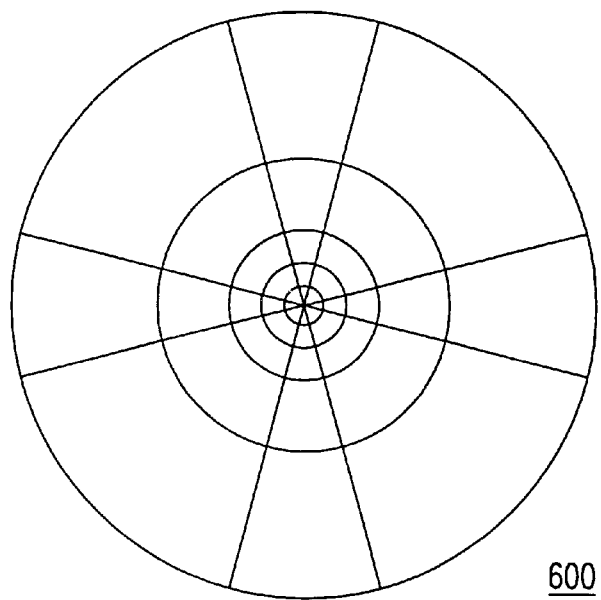
FIG. 6 shows a further alternative range of manipulations and division thereof.

FIG. 6 shows a further alternative range of manipulations and division thereof. The range 600 being circular, rings of circular form are more appropriate. For example with a joystick, a circular range can be imposed by a circular mechanical stop, limiting the movements of the member. The particular wedge corresponding to a particular manipulation could be determined by deriving some ratio of the sensor signals. For determining the ring, the magnitude of the manipulation should be derived by squaring and adding the sensor signals. In the data processing apparatus, X- and Y-values can be reconstructed by taking the product of the magnitude and the cosine and sine of an angle, the latter being determined by the wedge number.

The ideas of the invention equally apply to three dimensional input devices, like a 3D trackball. The concepts of wedges and rings are readily extended to a three-dimensional range. Furthermore, the invention applies both to input devices integrated with a keyboard, a remote control or even the data processing apparatus itself, like with a notebook, and to stand-alone input devices.

In summary, the invention relates to a method of encoding manipulations of a multidimensional input device, such as a mouse, into data to be communicated to a data processing apparatus. Sensors in the input device detect manipulations of a member of the input device with respect to an X-axis and a Y-axis. From the sensor data, a direction and a magnitude of the manipulation is derived. These intermediate quantities are communicated to the data processing apparatus instead of the X- and a Y-values themselves. In the data processing apparatus a decoder decodes the intermediate quantities into a further pair of X- and Y-values. The intermediate values more adequately represent the manipulations. Therefore, in input devices having a limited power budget, like TV remote controls and other wireless input devices, the method achieves a higher performance.

What is claimed is:

1. A method of transforming user manipulations of a multidimensional input device into code vectors for a data processing apparatus, the manipulations being confined to a range around an origin, the method comprising the steps:
   (1) dividing the range into a plurality of subranges;
   (2) assigning a unique code vector to each subrange; and
   (3) for a particular manipulation, determining a corresponding particular subrange and selecting a corresponding particular code vector for transmission to the data processing apparatus,
   characterized in that step (1) comprises the steps:
      (1a) dividing the range into a plurality of contiguous concentric rings around the origin; and
      (1b) dividing each ring into a same number of sectors thereby constituting the subranges.

2. The method as claimed in claim 1, characterized in that step (1b) comprises dividing the range into contiguous wedges extending from the origin and intersecting the rings, said subranges being formed of respective intersections of the wedges and the rings.

3. The method as claimed in claim 1, characterized in that step (1a) comprises dividing the range into a plurality of contiguous concentric rectangular rings around the origin.

4. The method as claimed in claim 1, characterized in that step (1a) comprises dividing the range into a plurality of contiguous concentric circular rings around the origin.

5. The method as claimed in claim 1, characterized in that step (2) comprises using code vectors, each one of which comprising a pair of numbers, a first number indicating one of the rings, a second number indicating one of the sectors of said ring.

6. The method as claimed in claim 3, characterized in that step (3) comprises for the particular manipulation, deriving digital values being projections of the particular manipulation on an X-axis and a Y-axis, and subsequently determining a maximum of said digital values and taking a representation thereof as a first group of bits of the corresponding particular code vector.

7. The method as claimed in claim 6, characterized in that step (1b) comprises arranging the subranges on lines extending radially from the origin, and step (3) comprises taking a line number, representing a particular one of said lines, as a second group of bits of the particular code vector.

8. A system comprising a multidimensional input device, a data processing apparatus and a communication channel between the multidimensional input device and the data processing apparatus, the multidimensional input device being arranged for transforming manipulations thereof by a user into code vectors for the data processing apparatus, the manipulations being confined to a range around an origin, the input device comprising selection means for dividing the range into a plurality of subranges being associated with respective unique code vectors, and for a particular manipulation, selecting a particular code vector assigned to a particular subrange to which the particular manipulation belongs; and transmission means for transmitting said particular code vector to the data processing apparatus, said data processing apparatus comprising a decoder for decoding said particular code vector into a delta vector, characterized in that said selection means divides the range into a plurality of contiguous concentric rings around the origin, each ring being divided into a same number of sectors thereby constituting the subranges.

9. The system as claimed in claim 8, characterized in that the selection means divides the range into a plurality of wedges extending from the origin and intersecting the rings, said subranges being formed by respective intersections of the rings and the wedges.

10. The system as claimed in claim 8, wherein the multidimensional input device further comprises sensor means for developing digital values that are proportional to respective projections of the manipulations on an X-axis and a Y-axis, characterized in that the selection means derives a first four bits of the code vector by mapping a maximum value of said digital values on one of sixteen levels, the decoder decoding the first four bits.

11. The system as claimed in claim 10, characterized in that the selection means arranges the subranges on sixteen lines extending radially from the origin, the selection means constructing a second four bits of the code vector representing a particular one of said lines, and the decoder decoding said first and second four bits.

12. A multidimensional input device for transforming manipulations thereof by a user into code vectors for output, the manipulations being confined to a range around an origin, the input device comprising selection means for dividing the range into a plurality of subranges, and for associating respective unique code vectors to each subrange, and for selecting a particular code vector of said unique code vectors for a particular manipulation that is assigned to a particular subrange to which the particular manipulation belongs; and transmission means for transmitting said particular code vector characterized in that the selection means divides the range into a plurality of contiguous concentric rings around the origin, each ring being divided into a same number of sectors thereby constituting the subranges.

* * * * *